US012583259B2

(12) United States Patent
Inada

(10) Patent No.: US 12,583,259 B2
(45) Date of Patent: Mar. 24, 2026

(54) PNEUMATIC TIRE

(71) Applicant: Toyo Tire Corporation, Itami (JP)

(72) Inventor: Yonosuke Inada, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 18/967,900

(22) Filed: Dec. 4, 2024

(65) Prior Publication Data

US 2025/0196538 A1     Jun. 19, 2025

(30) Foreign Application Priority Data

Dec. 14, 2023     (JP) ................................. 2023-210883

(51) Int. Cl.
B60C 9/22          (2006.01)

(52) U.S. Cl.
CPC ........ B60C 9/22 (2013.01); B60C 2009/2257 (2013.01); B60C 2009/228 (2013.01)

(58) Field of Classification Search
CPC ............ B60C 9/005; B60C 2009/2074; B60C 2009/2096
See application file for complete search history.

(56) References Cited

U.S. PATENT DOCUMENTS

| | | | | |
|---|---|---|---|---|
| 5,558,144 | A | * | 9/1996 | Nakayasu ............. B60C 9/2204 152/526 |
| 6,058,996 | A | * | 5/2000 | Suzuki .................... B60C 9/005 152/533 |
| 2005/0189057 | A1 | | 9/2005 | Yamazaki |
| 2022/0161602 | A1 | | 5/2022 | Fujimori et al. |

FOREIGN PATENT DOCUMENTS

| | | | | | |
|---|---|---|---|---|---|
| EP | 1961860 | A1 | * | 8/2008 | ........... D07B 1/1062 |
| JP | H08-164704 | A | | 6/1996 | |
| JP | 2005-239069 | A | | 9/2005 | |
| JP | 2006-069435 | A | | 3/2006 | |
| JP | 2010-47200 | A | | 3/2010 | |
| JP | 2013-230744 | A | | 11/2013 | |
| JP | 2020-104773 | A | | 7/2020 | |
| KR | 20060126101 | A | * | 12/2006 | ........... B60C 9/0042 |
| KR | 2021105514 | | * | 8/2021 | |

OTHER PUBLICATIONS

Extended European Search Report dated May 8, 2025, issued in counterpart Application No. 24216255.0. (9 pages).

* cited by examiner

*Primary Examiner* — Justin R Fischer

(74) *Attorney, Agent, or Firm* — WHDA, LLP

(57)          ABSTRACT

A pneumatic tire (1) including: a belt layer (20); and a belt reinforcing layer (30), in which: a filament diameter of each of steel cords of belt ply (21) is more than 0.10 mm and less than 0.25 mm; and A, B, and C satisfy relationships represented by the following, Expression (I): B/A<400 and Expression (II): 600<C/A<2000, where: A [N/inch] is a bending load per unit width of a sheet of the belt ply (21); B [N/inch] is a product of a load at 2% elongation of each of organic fiber cords of belt reinforcing ply (31) [N/cord] and the number of the organic fiber cords [cord/inch]; and C [N/inch] is a product of a load at 5% elongation of each of the organic fiber cords [N/cord] and the number of the organic fiber cords [cord/inch].

8 Claims, 3 Drawing Sheets

PNEUMATIC TIRE

CROSS REFERENCE TO RELATED APPLICATION

The entire disclosure of Japanese Patent Application No. 2023-210883 filed on Dec. 14, 2023, including the specification, claims, drawings, and abstract, is incorporated herein by reference in its entirety.

TECHNICAL FIELD

The present disclosure relates to a pneumatic tire.

BACKGROUND

Pneumatic tires are conventionally known that include a carcass, a belt layer arranged on an outer circumference of a crown of the carcass, and a belt reinforcing layer arranged on an outer circumference of the belt layer (see, for example, JP 2010-47200 A). In addition, studies have been conventionally conducted on increasing strength of steel cords included in belt ply that forms the belt layer, for an advantage of improving durability of the tire in high-speed driving (high-speed durability). As a method for increasing the strength of the steel cord, for example, the filament diameter of the steel cord may be increased.

SUMMARY

Technical Problem

When steel cords each with a large filament diameter are used for the belt ply, the tire weight increases and the bending rigidity of the belt ply tends to increase. This reduces the ground contact area of the tire and deteriorates the driving stability. For this reason, it is not easy to achieve both high-speed durability and driving stability of the tire at a high level while reducing the tire weight.

Solution to Problem

A pneumatic tire according to an aspect of the present disclosure is a pneumatic tire including: a carcass; a belt layer arranged on an outer circumference of a crown of the carcass; and a belt reinforcing layer arranged on an outer circumference of the belt layer, in which: the belt layer has belt ply in which steel cords are arranged at an angle to a tire circumferential direction; the belt reinforcing layer has a belt reinforcing ply on the outer circumference of the belt layer, the belt reinforcing ply having organic fiber cords arranged in the tire circumferential direction; a filament diameter of each steel cord is more than 0.10 mm and less than 0.25 mm; and A, B, and C satisfy relationships represented by the following Expression (I) and Expression (II), $$B/A < 400 \qquad \text{Expression (I)}$$

$$600 < C/A < 2000 \qquad \text{Expression (II)}$$

where: A [N/inch] is a bending load per unit width of a sheet of the belt ply; B [N/inch] is a product of a load at 2% elongation of each of the organic fiber cords [N/cord] and the number of the organic fiber cords implanted in the belt reinforcing ply [cord/inch]; and C [N/inch] is a product of a load at 5% elongation of each of the organic fiber cords [N/cord] and the number of the organic fiber cords implanted in the belt reinforcing ply [cord/inch].

Advantageous Effect of Invention

The pneumatic tire according to an aspect of the present disclosure can reduce the tire weight while achieving both high-speed durability and high driving stability of the tire.

BRIEF DESCRIPTION OF DRAWINGS

Embodiment(s) of the present disclosure will be described based on the following figures, wherein.

DESCRIPTION OF EMBODIMENT

The following describes an example of an embodiment of a pneumatic tire according to the present invention in detail, with reference to the drawings. The embodiment described below is merely an example, and the present invention is not limited to the following embodiment.

Figure 1:
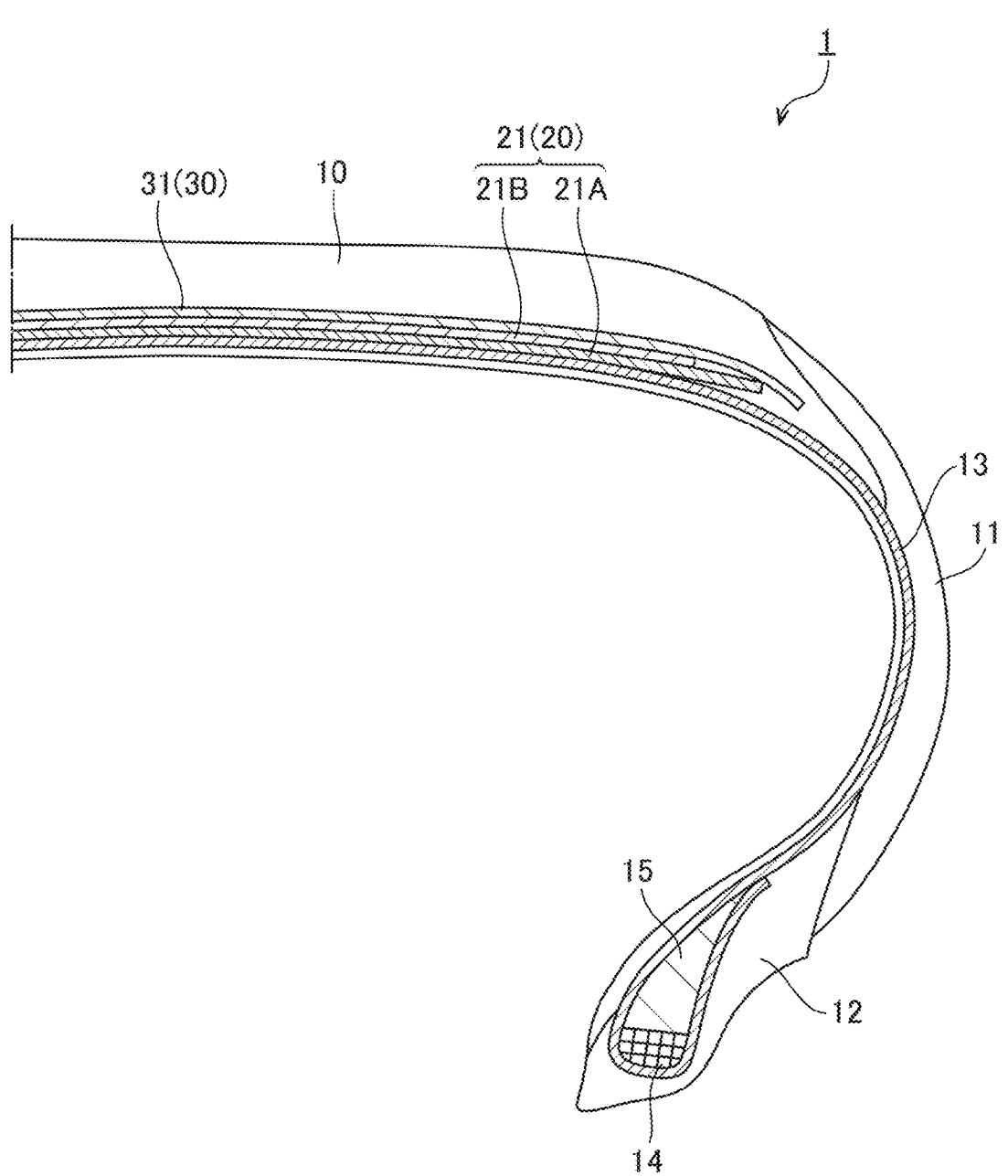
FIG. 1 is a sectional view of a pneumatic tire of an example in an embodiment, showing a half section in a tire axial direction.

FIG. 1 is a sectional view of a pneumatic tire 1 according to this embodiment, showing a half section in a tire axial direction. As shown in FIG. 1, the pneumatic tire 1 includes a tread 10 that is a portion that comes into contact with a road surface, a pair of sidewalls 11 arranged on opposite sides of the tread 10, and a pair of beads 12 arranged inside the sidewalls 11 in a tire radial direction. The pneumatic tire 1 also includes a carcass 13 that extends between a pair of beads 12.

The sidewalls 11 are arranged on opposite sides of the tread 10 and are provided in an annular shape in the tire circumferential direction. The sidewalls 11 are the portions of the pneumatic tire 1 that protrude furthest outward in a tire axial direction, and are gently curved so as to be convex toward the outside in the tire axial direction. The sidewalls 11 function to prevent damage to the carcass 13.

The beads 12 are portions arranged on the inner side of the sidewall 11 in the tire radial direction and fixed to a rim of a wheel. Each bead 12 includes a bead core 14 and a bead filler 15. The bead core 14 is an annular member that is made of a steel bead wire and extends over the entire circumference in the tire circumferential direction, and is embedded in the bead 12. The bead filler 15 is an annular hard rubber member that has a tapered tip that extends outward in the tire radial direction and that extends over the entire circumference in the tire circumferential direction.

The carcass 13 extends between the pair of beads 12 and is folded back around each bead core 14 to be engaged with the bead core 14. The carcass 13 is formed of at least one sheet of carcass ply. The carcass ply is formed by covering carcass cords made of organic fiber with coating rubber. The carcass cords are arranged substantially at a right angle (e.g., 80° or more and 90° or less) to the tire circumferential direction. Examples of organic fibers used for the carcass cords include polyester fiber, rayon fiber, aramid fiber, and nylon fiber.

The pneumatic tire 1 further includes a belt layer 20 arranged on the outer circumference of a crown of the carcass 13, and a belt reinforcing layer 30 arranged on the outer circumference of the belt layer 20. In other words, the belt layer 20 is arranged between the carcass 13 and the tread 10, and the belt reinforcing layer 30 is arranged between the belt layer 20 and the tread 10.

The belt layer 20 has belt ply 21 in which steel cords 22 (see FIG. 2) are arranged at an angle to the tire circumferential direction. The belt ply 21 is formed by covering steel cords 22 (see FIG. 2) with coating rubber. In this embodiment, the belt ply 21 is formed of two sheets of belt ply 21A and 21B. The steel cords 22 in the sheet of belt ply 21A and the steel cords 22 in the sheet of belt ply 21B are arranged so as to cross each other.

The belt reinforcing layer 30 is cap ply that covers the belt layer 20 with belt reinforcing ply 31. The belt reinforcing ply 31 is formed by covering organic fiber cords 32 (see FIG. 4) arranged in the tire circumferential direction with coating rubber 33 (see FIG. 4). As will be described in detail later, in this embodiment, each organic fiber cord 32 forming the belt reinforcing ply 31 is a composite fiber cord having yarn made of aliphatic polyamide fibers and yarn made of aromatic polyamide fibers twisted together. The belt reinforcing layer 30 can be formed by spirally winding the belt reinforcing ply 31 at an angle of 0° or more and 5° or less with respect to the tire circumferential direction so as to cover the entire belt layer 20 in the width direction.

In this embodiment, the belt reinforcing layer 30 is cap ply that covers the entire belt layer 20 in the width direction. However, the belt reinforcing layer 30 may be edge ply that covers the belt ends of the belt layer 20.

Figure 2:
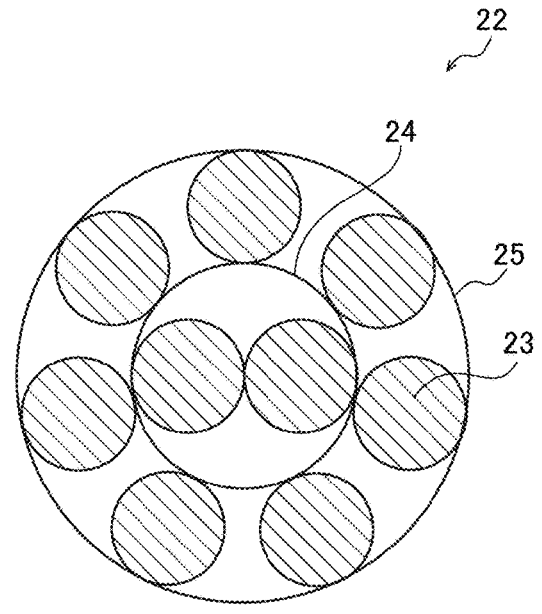
FIG. 2 is a schematic view showing a section of a steel cord forming belt ply of an example in the embodiment.
Figure 3:
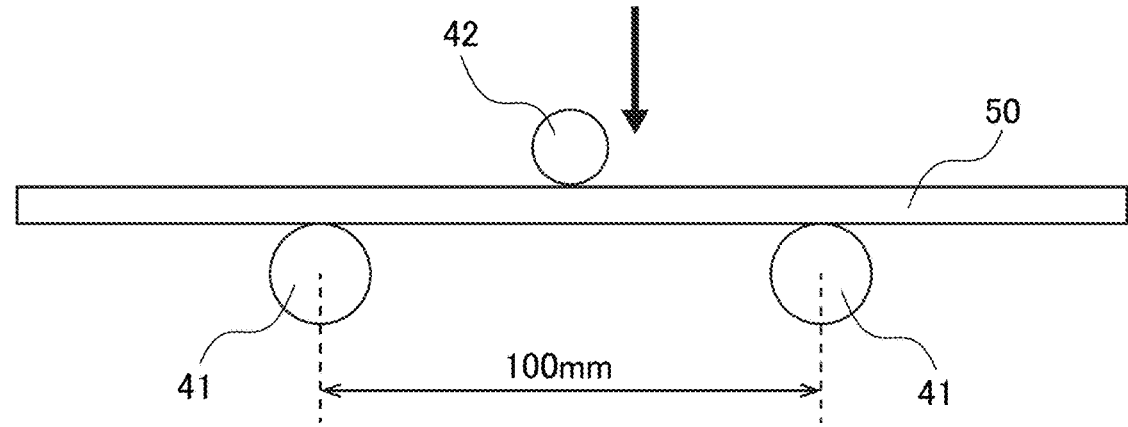
FIG. 3 is a view for describing a method for measuring bending rigidity of the belt ply.

Next, the belt ply 21 forming the belt layer 20 will be described in detail with reference to FIGS. 2 and 3. FIG. 2 is a schematic view showing a cross section of a steel cord 22 forming the belt ply 21.

As described above, the belt ply 21 is formed by covering the steel cords 22 (see FIG. 2) with a coating rubber. Here, in the belt layer 20, the angle of the steel cords 22 with respect to the tire circumferential direction (hereinafter referred to as the belt angle) is, for example, 20° or more and 45° or less. In this embodiment, the belt layer 20 is formed of two sheets of belt ply 21A and 21B. Therefore, the belt angles of the two sheets of belt ply 21A and 21B are both 20° or more and 45° or less with respect to the tire circumferential direction, the steel cords 22 in the belt ply 21A being arranged to cross the steel cords 22 in the belt ply 21B.

The structure of each steel cord 22 is not particularly limited, but as shown in FIG. 2, the structure is preferably a m+n multi-layer twisted structure (m=1 to 3, n=2 to 15) in which a plurality of filaments 23 are twisted together as a sheath 25 around a core 24 having one or more filaments 23 twisted together. Using the steel cords 22 having the above structure makes it easy to achieve both high-speed durability and driving stability of the tire.

The structure of a steel cord 22 is not limited to the above multi-layer twisted structure, and may include the following: a 1×n single twisted structure (n=2 to 15) in which n metal filaments are twisted together; and an m×n multi-twisted structure (m=3 to 5, n=2 to 4) formed by forming strands each having n metal filaments preliminarily twisted together and then further subjecting m strands to finish-twisting together.

The twist pitch of the steel cord 22 is not particularly limited, but is, for example, 5 mm or more and 13 mm or less, and preferably 7 mm or more and 11 mm or less.

The cord diameter of the steel cord 22 is not particularly limited, but is preferably 0.90 mm or less, and more preferably 0.3 mm or more and 0.7 mm or less. The cord diameter of the steel cord 22 of 0.3 mm or more and 0.7 mm or less makes it easy to achieve both high-speed durability and high driving stability of the tire.

The filament diameter of each steel cord 22 is more than 0.10 mm, preferably 0.12 mm or more, and more preferably 0.14 mm or more. The filament diameter of more than 0.10 mm can ensure the high-speed durability of the tire. In addition, the filament diameter of the steel cord 22 is less than 0.25 mm, preferably 0.23 mm or less, and more preferably 0.21 mm or less. The filament diameter of less than 0.25 mm can reduce the tire weight while the decreasing bending rigidity of the belt ply 21. This can increase the ground contact area of the tire in running, and further improve driving stability. Therefore, the filament diameter of the steel cord 22 is more than 0.10 mm and less than 0.25 mm, preferably 0.12 mm or more and 0.23 mm or less, and more preferably 0.14 mm or more and 0.21 mm or less. The filament diameter of the steel cord 22 may be more than 0.10 mm and 0.23 mm or less, or more than 0.10 mm and 0.21 mm or less. The filament diameter of the steel cord 22 may be 0.12 mm or more and less than 0.25 mm, or 0.14 mm or more and less than 0.25 mm.

The number of steel cords 22 implanted in the belt ply 21 is not particularly limited, and is, for example, 15 [cord/inch] or more and 30 [cord/inch] or less.

The cord bending rigidity per steel cord 22 is preferably 200 cN or less, and more preferably 150 cN or less. The cord bending rigidity per steel cord 22 of 200 cN or less makes it easy to reduce the bending rigidity of the belt ply 21. This increases the ground contact area of the tire, and can improve the driving stability. The lower limit of the cord bending rigidity per steel cord 22 is, for example, 80 cN. The cord bending rigidity per steel cord 22 of less than 80 cN excessively reduces the bending rigidity of the belt ply 21 and may conversely decrease driving stability. Therefore, the cord bending rigidity per steel cord 22 is preferably 80 cN or more and 200 cN or less, and more preferably 80 cN or more and 150 cN or less.

In this description, the cord bending rigidity is a value defined as the maximum load when one steel cord 22 is bent at its center with a fulcrum distance of 25.4 mm. Specifically, the value can be measured by conducting a three-point bending test using a tensile testing machine including a pair of support bars with a circular section (diameter=3 mm) arranged 25.4 mm apart, and a fixed bar with a circular section (diameter=3 mm) located vertically above the midpoint of the pair of support bars. More specifically, at room temperature, a steel cord 22 with a length of 80 mm is placed on the pair of support bars. The pair of support bars are then moved upward at a test speed of 500 mm/min, and the maximum load is measured when the steel cord 22 is bent with the fixed bars as a fulcrum. The average of the five maximum load measurements is the cord bending rigidity per steel cord 22.

The tensile strength (strength and elongation) per steel cord 22 is not particularly limited, but is, for example, 400 N or more and 1000 N or less. The tensile strength per steel cord is the maximum load required to break a test piece measured at a tensile speed of 500 m/min in accordance with the tensile test of the breaking load and total elongation at break (section 6.4) in "Testing methods for steel tire cords" of JIS G3510.

Here, if A [N/inch] is defined as the bending load per unit width of a sheet of belt ply 21, A just needs to be a value that satisfies the Expression (I) and Expression (II) described later. However, A is preferably 4.5 or less, and more preferably 4.0 or less. A set to 4.5 or less makes it easy to increase the ground contact area of the tire in running, and further improves the driving stability. Furthermore, A is preferably 1.5 or more, and more preferably 2.0 or more. A set to 1.5 or more makes it easy to ensure the high-speed durability of the tire. Therefore, the bending load per unit width A of the belt ply 21 is preferably 1.5 or more and 4.5 or less, and more preferably 2.0 or more and 4.0 or less. The bending load per unit width of the belt ply 21 can be adjusted by changing the material and thickness of the filaments 23 of each steel cord 22. For example, increasing the filament diameter can increase the bending load per unit width of the belt ply 21.

In this description, the bending load per unit width of the belt ply 21 is a value defined as the maximum load when a sheet of belt ply 21 is bent at its center with a fulcrum distance of 100 mm. Specifically, as shown in FIG. 3, the measurement can be performed using a tester including a pair of support rolls 41 with a circular section (diameter=20 mm) arranged 100 mm apart, and a pressing jig 42 with a circular section (diameter=15 mm) located vertically above the midpoint of the pair of support rolls 41. More specifically, the belt ply 21 is first cut into one-inch widths to produce a measurement sample 50. Then, at room temperature, the measurement sample 50 is placed on the pair of support rolls 41 so that the longitudinal direction of the steel cords 22 of the measurement sample 50 is perpendicular to the axial direction of the support roll 41. Then, the pressing jig 42 is moved downward (in the direction of an arrow) at a pressing speed of 300 mm/min, and the maximum load is measured with the measurement sample 50 being bent with the pressing jig 42 as a fulcrum. The average value of the five measurements of the maximum load is determined as the bending load per unit width of the belt ply 21.

The in-plane rigidity of a sheet of belt ply 21 is preferably 9.0 [kN/inch] or more, and more preferably 12 [kN/inch] or more. The in-plane rigidity of the belt ply 21 set to 9.0 [kN/inch] or more can ensure strength of the belt layer 20, and makes it easy to ensure high-speed durability. The in-plane rigidity of a sheet of belt ply 21 is preferably 25 [kN/inch] or less, and more preferably 20 [kN/inch] or less. The in-plane rigidity of the belt ply 21 set to 25 [kN/inch] or less makes it easy to increase the ground contact area of the tire in running, and further improve driving stability. Therefore, the in-plane rigidity of a sheet of belt ply 21 is preferably 9.0 [kN/inch] or more and 25 [kN/inch] or less, and more preferably 12 [kN/inch] or more and 20 [kN/inch] or less.

Here, the in-plane rigidity of the belt ply 21 means the rigidity of the belt ply 21 in the extending direction of the steel cords 22. Specifically, the in-plane rigidity of the belt ply 21 can be determined by multiplying the tensile strength (strength and elongation) of a steel cord 22 by the number of steel cords 22 implanted in the belt ply 21. The in-plane rigidity of the belt ply 21 can be adjusted by changing the material, number, or thickness of the filaments 23 of the steel cords 22. For example, increasing the number of filaments 23 can increase the in-plane rigidity of the belt ply 21. Increasing the filament diameter can increase the in-plane rigidity of the belt ply 21.

Figure 4:
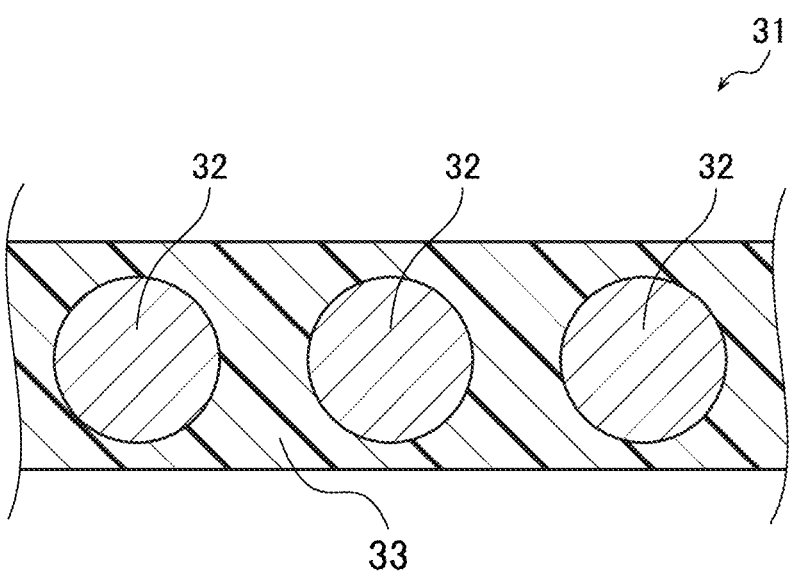
FIG. 4 is a schematic view showing part of a section of belt reinforcing ply of an example in the embodiment.

Next, the belt reinforcing ply 31 forming the belt reinforcing layer 30 will be described in detail with reference to FIG. 4. FIG. 4 is a schematic view showing part of a cross section of the belt reinforcing ply 31 forming the belt reinforcing layer 30.

As shown in FIG. 4, the belt reinforcing ply 31 is formed by covering organic fiber cords 32 arranged in the tire circumferential direction with coating rubber 33. Here, each organic fiber cord 32 is preferably a composite fiber cord formed by twisting yarn made of aliphatic polyamide fibers with yarn made of aromatic polyamide fibers. When the organic fiber cords 32 are the composite fiber cords described above, it is easy to adjust the load at 2% elongation and the load at 5% elongation of the organic fiber cords 32 described later within a predetermined range.

Examples of resins used as the aliphatic polyamide fibers include aliphatic polyamide resins such as nylon 6, nylon 66, nylon 46, nylon 11, nylon 12, nylon 610, nylon 612, nylon 6/66 copolymer, nylon 6/66/610 copolymer, nylon MXD6, nylon 6T, and nylon 6/6T copolymer. Among these, the resin is preferably nylon 66 from the viewpoint of adjusting the load at 2% elongation and the load at 5% elongation of each organic fiber cord 32 described later within a predetermined range.

The aromatic polyamide fiber is a polyamide having an aromatic skeleton in the main chain, and may be either para-aramid or meta-aramid. For example, any known aramid fiber used in this technical field may be used as appropriate.

The fineness of the organic fiber cord 32 is not particularly limited, but is, for example, 700 dtex or more, preferably 800 dtex or more, and more preferably 900 dtex or more. The fineness of the organic fiber cord 32 set to 700 dtex or more allows for reducing the number of organic fiber cords 32 implanted in the belt reinforcing ply 31 required to obtain the desired tire performance. This makes it less likely to cause adhesion failure between the organic fiber cord 32 and the rubber at the cut end of the belt reinforcing ply 31, making it easy to ensure the high-speed durability of the tire. In addition, the fineness of the organic fiber cord 32 is, for example, 3000 dtex or less, preferably 2500 dtex or less, and more preferably 2000 dtex or less. The fineness of the organic fiber cord 32 set to 3000 dtex or less can reduce the weight of the tire. Thus, the fineness of the organic fiber cord 32 is, for example, 700 dtex or more and 3000 dtex or less, preferably 800 dtex or more and 2500 dtex or less, and more preferably 900 dtex or more and 2000 dtex or less. The fineness is also referred to as the nominal fineness or the indicated fineness.

The number of the organic fiber cord 32 implanted in the belt reinforcing ply 31 is not particularly limited, but is preferably 15 [cord/inch] to 40 [cord/inch], and more preferably 20 [cord/inch] to 35 [cord/inch].

The number of twists per 10 cm of the organic fiber cord 32 is not particularly limited, but is preferably 25 [turns/10 cm] to 70 [turns/10 cm], and more preferably 25 [turns/10 cm] to 60 [turns/10 cm]. When the number of twists of the organic fiber cord 32 is 25 [turns/10 cm] to 70 [turns/10 cm], it is easy to adjust the load at 2% elongation and the load at 5% elongation of the organic fiber cord 32 to be described later within a predetermined range.

Here, B [N/inch] is defined as the product of the load at 2% elongation per organic fiber cord 32 (LASE 2%) [N/cord] and the number of organic fiber cords implanted in the belt reinforcing ply 31 [cord/inch]. C [N/inch] is defined as the product of the load at 5% elongation per organic fiber cord 32 (LASE 5%) [N/cord] and the number of organic fiber cords implanted in the belt reinforcing ply 31 [cord/inch]. In this case, A [N/inch], B [N/inch], and C [N/inch] described above satisfy the relationships represented by the following Expression (I) and Expression (II), A [N/inch] being the bending load per unit width of a sheet of belt ply 21.

$$B/A < 400 \qquad \text{Expression (I)}$$

$$600 < C/A < 2000 \qquad \text{Expression (II)}$$

(B/A) set to less than 400 appropriately balances the bending rigidity of the belt reinforcing ply 31 and the restraining force of the belt reinforcing layer 30, and allows for achieving both high-speed durability and high driving stability of the tire. In other words, (B/A) of 400 or more, for example, causes the restraining force of the belt reinforcing layer 30 to be too large, resulting in reduced ground contact area of the tire and deteriorated driving stability. (B/A) just needs to be less than 400, preferably less than 350, and more preferably less than 300. The lower limit of (B/A) is 50, for example. When (B/A) is 50 or less, the bending rigidity of the belt ply 21 tends to increase. This may reduce the ground contact area of the tire, and deteriorate driving stability. Therefore, the relationship may be 50<B/A<400, preferably 50<B/A<350, and more preferably 50<B/A<300.

Furthermore, (C/A) exceeding 600 ensures the restraining force of the belt reinforcing layer 30, and can ensure high-speed durability of the tire while improving driving stability. (C/A) just needs to be more than 600, preferably more than 700, and more preferably more than 800. In addition, (C/A) set to less than 2000 appropriately balances the bending rigidity of the belt reinforcing ply 31 and the restraining force of the belt reinforcing layer 30, and allows for achieving both high-speed durability and high driving stability of the tire. In other words, (C/A) of 2000 or more, for example, causes the restraining force of the belt reinforcing layer 30 to be too large, resulting in reduced ground contact area and deteriorated driving stability of the tire. (C/A) just needs to be less than 2,000, but is preferably less than 1,600, and more preferably less than 1,200. Therefore, the relationship is preferably 700<C/A<1600, and more preferably 800<C/A<1200. In addition, the relationship may be 600<C/A<1600, or 600<C/A<1200. It may also be 700<C/A<2000, or 800<C/A<2000.

In this description, the load at 2% elongation per organic fiber cord [N/cord] and the load at 5% elongation per organic fiber cord [N/cord] respectively mean the load at 2% elongation and the load at 5% elongation when a tensile test is conducted in accordance with JIS L1017 in a test room under standard conditions of a temperature of 20±2° C. and a relative humidity of 65±4%, as specified in JIS L0105.

The above B [N/inch] just needs to be within a range that satisfies the above Expression (I), but is preferably 400 or more, and more preferably 500 or more. B [N/inch] of less than 400 may make it difficult to maintain the tire shape and deteriorate driving stability. Furthermore, B [N/inch] is preferably 1000 or less, and more preferably 800 or less. B [N/inch] exceeding 1000 may cause the restraining force of the belt reinforcing layer 30 to be too large, resulting in reduced ground contact area of the tire and deteriorated driving stability. Therefore, B [N/inch] is preferably 400 or more and 1000 or less, and more preferably 500 or more and 800 or less.

The above C [N/inch] just needs to be in a range that satisfies the above Expression (II), but is preferably 1400 or more, and more preferably 1800 or more. C [N/inch] set to 1400 or more makes it easy to ensure high-speed durability. C [N/inch] is preferably 3000 or less, and more preferably 2600 or less. C [N/inch] set to 3000 or less allows for ensuring the ground contact area of the tire, thereby improving driving stability. Therefore, C [N/inch] is preferably 1400 or more and 3000 or less, and more preferably 1800 or more and 2600 or less.

The load (N) at 2% elongation and the load (N) at 5% elongation of each organic fiber cord 32 can be adjusted, for example, by selecting the type of fiber forming the organic fiber cord 32, adjusting the cord structure, the number of twists, the cord processing conditions, etc. For example, reducing the number of twists can increase the load at an elongation. Additionally, the cord processing conditions include the conditions of the dip processing in which the organic fiber cord 32 is immersed in a resin liquid for adhesion processing with rubber (resin liquid blend, processing temperature, tension, time, etc.). For example, when dip processing is performed using a resin liquid such as resorcin-formaldehyde-latex (RFL) or a blocked isocyanate aqueous solution, it is possible to increase the load at an elongation if a low-temperature bath is used and the tension applied to the organic fiber cord 32 is set high.

EXAMPLE

The following shows examples, but the present invention is not limited to these examples.

Steel cords and organic fiber cords are produced, each of which has a structure shown in Table 1 described later. The produced steel cords are used for belt ply, and the produced organic fiber cords are used for the belt reinforcing ply. Then, as shown in FIG. 1, the belt ply is formed of two sheets of ply, the belt reinforcing ply is formed of a sheet of ply, and a radial tire having a tire size of 205/50R16 87V is vulcanized and molded in the usual manner. The configuration of each tire is the same except for the belt layer and the belt reinforcing layer. The two sheets of belt ply are arranged so that the belt angles are +25° and −25°.

The tire weight, high-speed durability, and driving stability of the produced pneumatic tires are evaluated by the following methods.

<Tire Weight>

Tire weight is the total weight of one tire, and is expressed as an index with the total weight of the tire of Comparative Example 1 being 100. This means that a smaller number equates to a lower tire weight.

<High-Speed Durability>

Measurements were made in the following manner using a drum testing machine that conforms to FMVSS109 (UTQG) and has a rotating drum made of steel with a smooth surface and a diameter of 1700 mm. Each test tire is mounted on a standard rim specified by JIS with an internal pressure of 220 kPa (2.2 kgf/cm$^2$), and the load is 88% of the maximum load specified by JATMA. The tire undergoes preliminary run for 60 minutes at a speed of 80 km/h, is left to cool, has its air pressure adjusted again, and then undergoes an actual run. The actual run starts at 120 km/h, increases the speed by 8 km/h every 30 minutes, and keeps running until a failure occurs. The total running distance of the actual run until a failure occurs is expressed as an index with the high-speed durability of the tire of Comparative Example 1 being 100. This means that a higher index equates to a better high-speed durability.

<Driving Stability>

Each tire is assembled with an internal pressure of 200 kPa and mounted on a test vehicle with an engine displacement of 2000 cc, and then three trained test drivers each run the vehicle on a test course and evaluate the feel. The tire is scored on a 10-point scale based on a relative comparison with the tire of Comparative Example 1 scored as six, and the average score of the three drivers is expressed as an index, with the tire of Comparative Example 1 scored as 100. This means that a higher number equates to better driving stability.

Table 1 shows the tire weight, high-speed durability, and driving stability of each pneumatic tire.

TABLE 1

| | Item | Example 1 | Example 2 | Example 3 | Example 4 | Comparative Example 1 | Comparative Example 2 |
|---|---|---|---|---|---|---|---|
| Belt layer | Cord material | Steel | Steel | Steel | Steel | Steel | Steel |
| | Cord configuration | 2 + 7 × 0.175 | 2 + 7 × 0.175 | 2 + 7 × 0.200 | 2 + 7 × 0.150 | 2 + 2 × 0.25 | 2 + 2 × 0.25 |
| | Filament diameter (mm) | 0.175 | 0.175 | 0.200 | 0.150 | 0.250 | 0.250 |
| | Cord bending rigidity (cN/cord) | 120 | 120 | 155 | 90 | 220 | 220 |
| | Strength and elongation (N/cord) | 680 | 680 | 890 | 500 | 620 | 620 |
| | Number of cords (cord/inch) | 20 | 20 | 19 | 26 | 21 | 21 |
| | Belt bending load (N/inch) (A) | 2.6 | 2.6 | 3.3 | 2.4 | 5.7 | 5.7 |
| | In-plane rigidity (kN/inch) | 13.6 | 13.6 | 16.9 | 13.0 | 13.0 | 13.0 |
| Belt reinforcing layer | Cord material | Aramid Nylon 66 | Aramid Nylon 66 | Aramid Nylon 66 | Aramid Nylon 66 | Nylon 66 | Nylon 66 |
| | Cord configuration | 1100dtex 940dtex | 1670dtex 1400dtex | 1100dtex 940dtex | 1100dtex 940dtex | 1400dtex/2 | 900dtex/2 |
| | Load at 2% elongation (LASE 2%) (N/cord) | 18 | 25 | 18 | 18 | 21 | 12 |
| | Load at 5% elongation (LASE 5%) (N/cord) | 73 | 104 | 73 | 73 | 50 | 24 |
| | Number of cords (cord/inch) | 35 | 20 | 35 | 35 | 28 | 34 |
| | LASE 2% (N/cord) × number of cords [cord/inch] (B) | 630 | 500 | 630 | 630 | 588 | 408 |
| | LASE 5% (N/cord) × number of cords [cord/inch] (C) | 2555 | 2080 | 2555 | 2555 | 1400 | 816 |
| | B/A | 242 | 192 | 191 | 263 | 103 | 72 |
| | C/A | 983 | 800 | 774 | 1065 | 246 | 143 |
| Evaluation result (Index) | Tire weight | 94 | 95 | 96 | 94 | 100 | 98 |
| | High-speed durability | 110 | 110 | 112 | 105 | 100 | 95 |
| | Driving stability | 118 | 117 | 112 | 120 | 100 | 98 |

| | Item | Comparative Example 3 | Comparative Example 4 | Comparative Example 5 | Comparative Example 6 | Comparative Example 7 |
|---|---|---|---|---|---|---|
| Belt layer | Cord material | Steel | Steel | Steel | Steel | Steel |
| | Cord configuration | 2 + 7 × 0.175 | 2 + 7 × 0.250 | 2 + 7 × 0.100 | 2 + 7 × 0.175 | 2 + 7 × 0.175 |
| | Filament diameter (mm) | 0.175 | 0.250 | 0.100 | 0.175 | 0.175 |
| | Cord bending rigidity (cN/cord) | 120 | 520 | 70 | 120 | 120 |
| | Strength and elongation (N/cord) | 680 | 1380 | 225 | 680 | 680 |
| | Number of cords (cord/inch) | 20 | 12 | 35 | 20 | 20 |
| | Belt bending load (N/inch) (A) | 2.6 | 6.4 | 2.2 | 2.6 | 2.6 |
| | In-plane rigidity (kN/inch) | 13.6 | 16.6 | 7.9 | 13.6 | 13.6 |
| Belt reinforcing layer | Cord material | Aramid | Aramid Nylon 66 | Aramid Nylon 66 | Aramid Nylon 66 | Aramid Nylon 66 |
| | Cord configuration | 1100dtex/2 | 1100dtex 940dtex | 1100dtex 940dtex | 550dtex 440dtex | 2200dtex 1670dtex |
| | Load at 2% elongation (LASE 2%) (N/cord) | 58 | 18 | 18 | 8 | 35 |
| | Load at 5% elongation (LASE 5%) (N/cord) | 113 | 73 | 73 | 30 | 250 |
| | Number of cords (cord/inch) | 19 | 35 | 35 | 40 | 22 |
| | LASE 2% (N/cord) × number of cords [cord/inch] (B) | 1102 | 630 | 630 | 320 | 770 |
| | LASE 5% (N/cord) × number of cords [cord/inch] (C) | 2147 | 2555 | 2555 | 1200 | 5500 |
| | B/A | 424 | 98 | 286 | 123 | 296 |
| | C/A | 826 | 399 | 1161 | 462 | 2115 |
| Evaluation result (Index) | Tire weight | 94 | 105 | 93 | 94 | 98 |
| | High-speed durability | 95 | 106 | 90 | 95 | 115 |
| | Driving stability | 95 | 95 | 102 | 98 | 97 |

As shown in Table 1, the pneumatic tires of Examples 1 to 4 all have a lighter tire weight than the pneumatic tire of Comparative Example 1, while achieving both high-speed durability and high driving stability. In other words, it can be said that if the filament diameter of each steel cord is set to more than 0.10 mm and less than 0.25 mm while the relationships represented by the above Expression (I) and Expression (II) are satisfied, it is possible to achieve both high-speed durability and high driving stability of the tire.

In contrast, the pneumatic tire of Comparative Example 5, which has a filament diameter of 0.10 mm, has a lighter tire weight but decreased high-speed durability. This is presum-ably because the filament diameter of 0.10 mm or less cannot ensure the strength of the belt layer.

In addition, the pneumatic tire of Comparative Example 4, which has a filament diameter of 0.25 mm, has improved high-speed durability but an increased tire weight and decreased driving stability. This is presumably because the filament diameter of 0.25 mm or more increases the tire weight while causing a tendency for the bending rigidity of the belt ply to increase, reducing the ground contact area of the tire and deteriorating driving stability.

The pneumatic tire of Comparative Example 3, in which (B/A) is 400 or more, has both decreased high-speed durability and driving stability. As described above, (B/A) is an index showing the balance between the bending rigidity of the belt reinforcing ply 31 and the restraining force of the belt reinforcing layer 30. Therefore, (B/A) of 400 or more does not allow for achieving both high-speed durability and high driving stability of the tire.

The pneumatic tires of Comparative Examples 2 and 6, in which (C/A) is 600 or less, have both decreased high-speed durability and driving stability. This is presumably because (C/A) of 600 or less excessively reduces the restraining force of the belt reinforcing layer 30, which not only reduces high-speed durability but also excessively decreases the ground contact area, conversely resulting in decreased driving stability.

The pneumatic tire of Comparative Example 7, in which (C/A) is 2000 or more, has improved high-speed durability but decreased driving stability. This is presumably because (C/A) of 2000 or more causes the restraining force of the belt reinforcing layer 30 to be too large, reducing the ground contact area of the tire and deteriorating driving stability.

REFERENCE SIGNS LIST

1 pneumatic tire, 10 tread, 11 sidewall, 12 bead, 13 carcass, 14 bead core, 15 bead filler, 20 belt layer, 21, 21A, 21B belt ply, 22 steel cord, 23 filament, 24 core, 25 sheath, 30 belt reinforcing layer, 31 belt reinforcing ply, 32 organic fiber cord (composite fiber cord), 33 coating rubber, 41 support roll, 42 pressing jig, 50 measurement sample

The invention claimed is:

1. A pneumatic tire comprising:

a carcass;

a belt layer arranged on an outer circumference of a crown of the carcass; and a belt reinforcing layer arranged on an outer circumference of the belt layer, wherein the belt layer has belt ply in which steel cords are arranged at an angle to a tire circumferential direction, the belt reinforcing layer has a belt reinforcing ply on the outer circumference of the belt layer, the belt reinforcing ply having organic fiber cords arranged in the tire circumferential direction, a filament diameter of each steel cord is more than 0.10 mm and less than 0.25 mm, each organic fiber cord is a composite fiber cord formed by twisting yarn made of aliphatic polyamide fibers with yarn made of aromatic polyamide fibers, a fineness of the aliphatic polyamide fibers is 900 dtex or more, and A, B, and C satisfy relationships represented by the following Expression (I) and Expression (II), $$B/A < 400 \qquad \text{Expression (I)}$$

$$600 < C/A < 2000 \qquad \text{Expression (II)}$$

where: the A [N/inch] is a bending load per unit width of a sheet of the belt ply;

B [N/inch] is a product of a load at 2% elongation of each of the organic fiber cords [N/cord] and the number of the organic fiber cords implanted in the belt reinforcing ply [cord/inch]; and C [N/inch] is a product of a load at 5% elongation of each of the organic fiber cords [N/cord] and the number of the organic fiber cords implanted in the belt reinforcing ply [cord/inch].

2. The pneumatic tire according to claim 1, wherein in-plane rigidity of the belt ply is 9 [kN/inch] or more.

3. The pneumatic tire according to claim 1, wherein A is 1.5 or more and 4.5 or less.

4. The pneumatic tire according to claim 1, wherein B is 400 or more and 1000 or less.

5. The pneumatic tire according to claim 1, wherein C is 1400 or more and 3000 or less.

6. The pneumatic tire according to claim 1, wherein a ratio (B/A) of B to A satisfies 50<B/A<300.

7. The pneumatic tire according to claim 1, wherein a ratio (C/A) of C to A satisfies 800<C/A<1200.

8. The pneumatic tire according to claim 1, wherein a filament diameter of each steel cord is 0.14 mm or more and 0.21 mm or less.

\* \* \* \* \*